(12) United States Patent
Sano et al.

(10) Patent No.: US 9,034,509 B2
(45) Date of Patent: May 19, 2015

(54) POLYOLEFIN MICROPOROUS MEMBRANE AND METHOD OF PRODUCING THE SAME, SEPARATOR FOR NON-AQUEOUS SECONDARY BATTERY AND NON-AQUEOUS SECONDARY BATTERY

(75) Inventors: Hiroki Sano, Iwakuni (JP); Satoshi Nishikawa, Iwakuni (JP); Takashi Yoshitomi, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 208 days.

(21) Appl. No.: 13/636,605

(22) PCT Filed: Mar. 24, 2011

(86) PCT No.: PCT/JP2011/057247
§ 371 (c)(1),
(2), (4) Date: Sep. 21, 2012

(87) PCT Pub. No.: WO2011/118735
PCT Pub. Date: Sep. 29, 2011

(65) Prior Publication Data
US 2013/0011716 A1    Jan. 10, 2013

(30) Foreign Application Priority Data

Mar. 24, 2010   (JP) ................. 2010-068117
Mar. 24, 2010   (JP) ................. 2010-068118
Mar. 24, 2010   (JP) ................. 2010-068119

(51) Int. Cl.
| | |
|---|---|
| *H01M 2/16* | (2006.01) |
| *H01M 2/18* | (2006.01) |
| *B32B 23/08* | (2006.01) |
| *B32B 27/08* | (2006.01) |
| *B32B 27/28* | (2006.01) |
| *B32B 27/32* | (2006.01) |
| *B32B 27/34* | (2006.01) |
| *H01M 2/14* | (2006.01) |
| *H01M 2/34* | (2006.01) |
| *H01M 10/0525* | (2010.01) |
| *H01M 10/0565* | (2010.01) |

(52) U.S. Cl.
CPC ............. *H01M 2/1653* (2013.01); *B32B 23/08* (2013.01); *B32B 27/08* (2013.01); *B32B 27/281* (2013.01); *B32B 27/285* (2013.01); *B32B 27/286* (2013.01); *B32B 27/288* (2013.01); *B32B 27/32* (2013.01); *B32B 27/34* (2013.01); *H01M 2/145* (2013.01); *H01M 2/166* (2013.01); *H01M 2/34* (2013.01); *H01M 2/348* (2013.01); *H01M 10/0525* (2013.01); *H01M 10/0565* (2013.01); *H01M 2200/10* (2013.01); *Y02T 10/7011* (2013.01)

(58) Field of Classification Search
None
See application file for complete search history.

(56) References Cited

U.S. PATENT DOCUMENTS

2010/0021822 A1* 1/2010 Ikemoto et al. ............... 429/247
2010/0173187 A1   7/2010 Nishikawa et al.

FOREIGN PATENT DOCUMENTS

| | | |
|---|---|---|
| JP | 2004-51772 A | 2/2004 |
| JP | 2005-209570 A | 8/2005 |
| JP | 2006-19082 A | 1/2006 |
| JP | 2006-111712 A | 4/2006 |
| JP | 2007-72383 A | 3/2007 |
| JP | 2010-24463 A | 2/2010 |
| WO | 2008/062727 A1 | 5/2008 |
| WO | 2008/156033 A1 | 12/2008 |
| WO | 2008149986 | 12/2008 |

OTHER PUBLICATIONS

Machine translation of Kohei et al JP 2010024463. Translation obtained from JPO website.*
Machin translation of Michio et al JP 2006-019082. Translation obtained from JPO website.*
Nicole S.J.A. Gerrits, "Porous biaxially drawn ultra-high molecular weight polyethylene films"; Polymer, vol. 32, No. 10, pp. 1770-1775 (1991).
Andrew J. Peacock, Handbook of Polyethylene; cover page and pp. 124-125 (2000); Marcel Dekker, Inc.; New York Basel.

* cited by examiner

*Primary Examiner* — Sarah A Slifka
(74) *Attorney, Agent, or Firm* — Sughrue Mion, PLLC

(57) ABSTRACT

The present invention provides a polyolefin microporous membrane in which a degree of crystallinity is from 60 to 85%, and a tie molecular volume fraction is from 0.7 to 1.7%.

5 Claims, No Drawings

POLYOLEFIN MICROPOROUS MEMBRANE AND METHOD OF PRODUCING THE SAME, SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2011/057247, filed on Mar. 24, 2011 (claiming priority from Japanese Patent Application Nos. 2010-068117, 2010-068118, and 2010-068119, all filed on Mar. 24, 2010), the contents of which are incorporated herein by reference in their entirety.

TECHNICAL FIELD

The present invention relates to a polyolefin microporous membrane, and particularly to a technique for improving the safety and properties of a non-aqueous secondary battery.

BACKGROUND ART

A non-aqueous secondary battery represented by a lithium ion secondary battery which uses, as a positive electrode, lithium-containing transition metal oxides as represented by lithium cobaltate and uses, as a negative electrode, carbon material which is capable of doping and dedoping lithium is characterized by having a high energy density. By this characteristic, a non-aqueous secondary battery is important as a battery for portable electronic appliances represented by a cellular phone. Along with the fast popularization of these portable electronic appliances, demand therefor is ever-increasing.

Large numbers of vehicles which are conscious of environmental responsiveness, such as hybrid vehicles, are being developed. As a power source mounted on a vehicle, a lithium ion secondary battery having a high energy density is attracting a great deal of attentions.

Most lithium ion secondary batteries are composed of a layered body of a positive electrode, a separator containing electrolyte and a negative electrode. A principal function of the separator is to prevent short circuit between a positive electrode and a negative electrode, and examples of required properties of the separator include permeability of lithium ion, strength and durability.

At present, as a film suitable for a separator for lithium ion secondary battery, a large number of varieties of polyolefin microporous membranes are proposed. A polyolefin microporous membrane satisfies the above-mentioned required properties and has, as a safety function at high temperature, a so-called shutdown function, which is a thermal runaway preventing function by shutting down the current by blocking holes due to a high temperature. Therefore, a polyolefin microporous membrane is widely used for a separator for lithium ion secondary battery.

However, there are cases where the temperature inside the battery exceeds the melting point of polyethylene constituting a microporous membrane, even when the shutdown function works and the holes of polyethylene microporous membranes are blocked whereby the electric current is temporarily shutdown. When the limit of the heat resistance of the polyolefin microporous membrane is exceeded, the microporous membrane per se melts, and the shutdown function is lost. As a result, a short circuit between electrodes triggers heat runaway of the battery. At this point, a breaking in a device in which the lithium ion battery is installed or an accident due to ignition may occur. For this reason, in order to ensure further safety, a separator which can maintain the shutdown function even at a high temperature is demanded.

Therefore, in Patent Document 1, proposed is a separator for non-aqueous secondary battery in which the surface of a polyethylene microporous membrane is covered with a heat-resistant porous layer composed of heat resistant polymer such as fully aromatic polyamides. In Patent Document 2, disclosed is a configuration in which inorganic particulates such as alumina are contained in a heat-resistant porous layer, to thereby improve a heat resistance as well as a shutdown function. In Patent Document 3, disclosed is a configuration in which metal hydroxide particulates such as aluminium hydroxides are contained in a heat-resistant porous layer, to thereby improve a flame resistance as well as a shutdown function and a heat resistance. In these configurations, excellent effects can be expected from the viewpoint of the safety of the batteries on this point that the shutdown function and the heat resistance are gone together.

PATENT DOCUMENTS

Patent Document 1 JP 2005-209570 A
Patent Document 2 WO 2008/062727 A1
Patent Document 3 WO 2008/156033 A1

DISCLOSURE OF THE INVENTION

Problem to be Solved by the Invention

However, the separator for non-aqueous secondary battery has a structure in which the polyolefin microporous membrane is coated with a heat-resistant porous layer. By this, the shutdown function which polyolefin microporous membrane has tends to be restrained. Therefore, the polyolefin microporous membrane has been required to have a high shutdown function. However, when the composition of the polyolefin microporous membrane is made such that flowability of the polyolefin is high in order to improve the shutdown function of the polyolefin microporous membrane, the mechanical strength of the polyolefin microporous membrane decreases. As a result, there has been a problem that the mechanical strength of the separator for non-aqueous secondary battery decreases.

Recently, from the viewpoint of making the capacity of lithium ion battery high, a variety of high-capacity type positive electrode materials and negative electrode materials are developed. In such high-capacity type positive and negative electrode materials, there are many cases that volume change during charge and discharge is large. Therefore, a problem arises in which the battery properties decrease when a large volume change of the electrode occurs.

In other words, the separator is disposed between the positive electrode and the negative electrode. When charge and discharge of the battery are performed, a compressive force or a restoring force is applied in the thickness direction of the separator due to the expansion and shrink of the electrode. In the case of low-capacity type positive and negative electrode materials such as conventional lithium cobaltate or hard carbon, the volume change of the electrode is small. Therefore, the deformation of the separator in the thickness direction is small, the battery properties are not particularly affected. However, in the case of using an electrode material which has a large volume change during charge and discharge such as high-capacity type positive and negative electrode materials, the acting force which of the electrode to the separator becomes large. Subsequently, there are cases where the separator cannot follow the volume change of the electrode. the porous structure of the separator cannot recover from a compressed state, a phenomenon in which a sufficient amount of electrolyte cannot be retained in the holes of the separator, that is, a liquid depletion phenomenon may occur. This liquid depletion phenomenon may consequently deteriorate the repeated charge-discharge property (cycle property) of the battery.

In order to solve the liquid depletion problem, it is conceivable that the physical properties such as elasticity of the polyolefin microporous membrane is controlled. As mentioned above, good shutdown properties and mechanical strength are also demanded for the polyolefin microporous membrane, and when a certain physical property of the polyolefin microporous membrane is controlled, other physical properties are necessarily also affected. Therefore, a technique is desired in which these various properties can be improved with balance.

The present invention is devised in view of the above circumstances. Under the above mentioned circumstances, a polyolefin microporous membrane in which, even when the polyolefin microporous membrane is complexed with a heat-resistant porous layer, good mechanical strength and shutdown properties can be obtained and electrolyte depletion is prevented, and a method of producing the same, a separator for non-aqueous secondary battery and a non-aqueous secondary battery are needed to be provided.

Means for Solving the Problems

In order to solve the above problems, the present inventors intensively studied to discover that the above problems can be solved by the following constitutions.

The present invention is a polyolefin microporous membrane which has a degree of crystallinity of 60 to 85%, and a tie molecular volume fraction of from 0.7 to 1.7%.

The present invention is a separator for non-aqueous secondary battery which includes the polyolefin microporous membrane and a heat-resistant porous layer(s) containing heat resistant resin provided on one side or both sides of the polyolefin microporous membrane. The present invention is a separator for non-aqueous secondary battery which includes the polyolefin microporous membrane and an adhesive porous layer(s) containing vinylidene fluoride resin provided on one side or both sides of the polyolefin microporous membrane.

The present invention is a non-aqueous secondary battery, which includes a positive electrode, a negative electrode and the polyolefin microporous membrane or the separator for non-aqueous secondary battery which is disposed between the positive electrode and the negative electrode, and wherein an electromotive force is obtained by doping and dedoping lithium.

The present invention is a method of producing a polyolefin microporous membrane, including preparing a polyolefin solution by melt-kneading from 1 to 35 parts by mass of polyolefin and from 65 to 99 parts by mass of mixed solvent composed of a volatile solvent and a nonvolatile solvent at a temperature of from 190 to 220° C.; forming a gel composition by extruding the polyolefin solution through a die at a temperature from the melting point of the polyolefin to the melting point +60° C. and by cooling the extruded polyolefin solution; removing the volatile solvent from the gel composition; drawing the gel composition; and removing the nonvolatile solvent from the gel composition.

Effects of the Invention

By the present invention, a polyolefin microporous membrane in which even when the polyolefin microporous membrane is complexed with a heat-resistant porous layer, good mechanical strength and shutdown properties are obtained and electrolyte depletion is prevented, a method of producing the same, and a separator for non-aqueous secondary battery can be provided.

By the present invention, a non-aqueous secondary battery in which the safety and battery properties are improved can be provided.

BEST MODES FOR CARRYING OUT THE INVENTION

In the following, embodiments of the present invention is described sequentially. These description and Examples illustrate the present invention and the scope of the present invention is not limited thereto.

[Polyolefin Microporous Membrane]

The term "microporous membrane" as in "polyolefin microporous membrane of the present invention", means a membrane which has a large number of micropores inside and has a structure in which these micropores are connected to each other, wherein gases or liquids can pass from one side of the membrane to the other side of the membrane.

Examples of the raw materials of polyolefin microporous membrane of the present invention can include polyolefins such as polyethylene, polypropylene, polymethylpentene and copolymer thereof. Among these, polyethylene is preferred, and a high-density polyethylene or a mixture of a high-density polyethylene and an ultra-high molecular weight polyethylene is more preferred, from the viewpoint of the strength, the heat resistance or the like.

In the case of polyethylene, a weight-averaged molecular weight of 500,000 to 5,000,000 is suitable, and a polyethylene composition having 1% by mass or higher of an ultra-high molecular weight polyethylene having a weight-averaged molecular weight of 1,000,000 or higher is particularly preferred. Further, a polyethylene composition having 10 to 90% by mass of ultra-high molecular weight polyethylene having a weight-averaged molecular weight of 1,000,000 or higher is suitable.

The density of the high-density polyethylene (JIS K 6748-1981) is preferably 0.942 g/cm$^3$ or higher.

To a high-density polyethylene or a mixture of a high-density polyethylene and an ultra-high molecular weight polyethylene, a low-density polyethylene may be added.

The polyolefin microporous membrane of the present invention may consist of 90% by mass or higher of polyolefin, and 10% by mass or less of other ingredients which do not have an effect on battery properties may be contained.

The polyolefin microporous membrane of the present invention has a degree of crystallinity of 60 to 85%, and a tie molecular volume fraction of from 0.7 to 1.7%.

When the degree of crystallinity and the tie molecular volume fraction are in the above range, an excellent mechanical strength and shutdown properties can be obtained even when a polyolefin microporous membrane is complexed with a heat-resistant porous layer. Since this polyolefin microporous membrane has an appropriate degree of crystallinity and a tie molecular volume fraction, the shape of the holes is favorably recovered with respect to repeated deformations generated by the volume change of an electrode caused by charge and discharge, thereby preventing electrolyte depletion.

Here, if polyolefins are classified from the viewpoint of crystal, they are roughly divided into: an extended-chain crystal which is formed by the orientation of extended high polymer chain and which affects the tensile strength; a lamellar crystal which is formed by a high polymer chain which is folded in the molecule or intermolecularly; and an amorphous portion which freely moves. The amorphous portion has a tie molecule portion which crosslinks between lamellar crystals and have effect on penetration strength, and a portion which is in a equilibrium state between the crystal portion and the amorphous portion and which can move freely.

In the present invention, as shown in the formula (1) below, the degree of crystallinity of polyolefins can be determined by the ratio of the melting energy measured by DSC and the theoretical melting energy of the crystal. In the present invention, as the theoretical melting energy, 289 J/g·K was employed.

$$\text{degree of crystallinity [\%]} = \{(\text{measured melting energy})/(\text{theoretical melting energy})\} \times 100 \quad (1)$$

In the above formula (1), the measured melting energy means the total of the melting energies of the extended chain and the lamellar crystal. The higher the degree of crystallinity, the more, the melting point, the tensile strength and the penetration strength of the polyolefin microporous membrane improve. That the degree of crystallinity becomes high means that the amorphous portion decreases.

Polymer has a portion where a part of the polymer is entangled by a tie molecule in the amorphous portion. When the degree of crystallinity becomes high, the amorphous portion decreases and as a result, the tie molecule density of the amorphous portion becomes high. This amorphous portion is usually formed at the end of or on the side chain of the crystal portion, and an entanglement at the amorphous portion restrains crystals together. As a result, from the viewpoint of the mechanical strength, the entanglement leads to improvement of the penetration strength. However, the restraint between crystals also causes an improvement of the melting point and causes decrease in the shutdown properties. Therefore, the degree of crystallinity is effectively in the range of 60 to 85%. A preferable range of the degree of crystallinity is 60 to 80%.

As shown in the formula (2) below, the tie molecule volume fraction can be determined by the tensile modulus of a sample to the theoretical tensile modulus of polyolefin. The theoretical tensile modulus was 41 GPa. The tensile modulus of the sample was a value obtained by dividing the measured value by (100−porosity)/100, presuming the state that the porosity of the polyolefin is 0%.

$$\text{tie molecule volume fraction [\%]} = \{(1 - 0.01 \times \text{degree of crystallinity}) \times \text{elastic modulus of sample}\}/(\text{theoretical elastic modulus} - 0.01 \times \text{degree of crystallinity} \times \text{elastic modulus of sample})\} \times 100 \quad (2)$$

Since the tie molecule means a restraint between crystals by entanglement of the amorphous portions, the more the tie molecules exists, the higher penetration strength is brought about. However, the restraint between the crystals causes an increase in the melting point along therewith, thereby causing decrease in the shutdown properties. For this reasons, in order to go together the shutdown properties and the penetration strength, it is required to achieve a balance of the tie molecule volume fraction. In this point of view, the tie molecule volume fraction is effectively in the range of from 0.7 to 1.7%.

The tie molecule volume fraction is preferably in the range of from 0.7 to 1.5%, and preferably in the range of 1.0 to 1.5%.

In the present invention, a method of controlling the degree of crystallinity and the tie molecule volume fraction is not particularly limited, and specific examples thereof include drawing conditions or heat fixation conditions of polyolefin microporous membrane, a control of the molecular weight distribution or the branched structure of the polyolefin used for the raw material and a control of a kneading temperature of a raw material.

Generally, the higher the molecular weight, the less the branched structures, the stronger the drawing conditions and the lower the heat fixation temperature, the better the degree of crystallinity tends to improve. The higher the molecular weight, the more the branched structures and the stronger the drawing conditions, the better the tie molecule volume fraction tends to improve.

In the present invention, particularly in order for the degree of crystallinity and the tie molecule volume fraction to fall within the above ranges, a method of controlling the resin temperature at the time when polyolefin is melt-extruded (i.e., extruding temperature) in the range of from 190 to 220° C. is preferred.

In the polyolefin microporous membrane of the present invention, the number average molecular weight of polyolefin constituting the microporous membrane is preferably from 30,000 to 80,000. When the number average molecular weight of the polyolefin is in the above-mentioned range, the shutdown properties and mechanical strength of the separator become more excellent. In this case, the tie molecule volume fraction is preferably in the range of 1.0 to 1.7%.

The larger the number average molecular weight of polyolefin, the higher the occurrence of entanglements of high polymer chains. When the number average molecular weight is not more than 80,000, the flowability of the polyolefin is favorable, and the shutdown properties can be maintained favorable. When the number average molecular weight is not less than 30,000, the mechanical strength can be maintained.

Among others, the number average molecular weight of polyolefin is preferably from 30,000 to 50,000.

When two or more polyolefins are mixed to be used, the number average molecular weight measured in the mixed state is denoted as the number average molecular weight of the present invention.

In the polyolefin microporous membrane of the present invention, the number of short chain branches contained on 1000 carbon atoms on the main chain of polyolefin constituting the microporous membrane is preferably from 1 to 5. When the number of short chain branches in polyolefin is in the above-mentioned range, the shutdown properties and the mechanical strength of the separator become excellent. In this case, the tie molecule volume fraction is preferably in the range of from 0.7 to 1.5%, and more preferably 1.0 to 1.5%.

The larger the number of short chain branches of the polyolefin, the higher the occurrence of entanglement of high polymer chains. When the number of short chain branches on 1000 carbon atoms on the main chain is not more than 5, the flowability of the polyolefin is favorable, and the shutdown properties can be maintained favorable. When the number of short chain branches is not less than one, the mechanical strength can be maintained. Among the above-mentioned, the number of short chain branches is more preferably, from 1 to 2.

According to the method described in pp. 590-594 of "Handbook of Polymer Analysis", (The Japan Society for Analytical Chemistry, Research Committee of Polymer Analysis), the number of short chain branches of the polyolefin per 1000 carbon atoms on the main chain can be determined by using a characteristic absorption specific to a branch measured by infrared spectrophotometer and the conversion factor described in "Handbook of Polymer Analysis".

In the polyolefin microporous membrane, since the molecular weight of polyolefin, the tie molecular volume fraction and the number of short chain branches are controlled in appropriate ranges, the shape of the holes is favorably recovered with respect to repeated deformations generated by the volume change of an electrode caused by charge and discharge, thereby preventing electrolyte depletion.

In the following, preferred physical properties of polyolefin of the present invention will be described.

From the viewpoint of the energy density, the load characteristics, the mechanical strength and the handling properties of non-aqueous secondary battery, the membrane thickness of a polyolefin microporous membrane of the present invention is preferably 5 to 25 μm.

From the viewpoint of the permeability, the mechanical strength and the handling properties, the porosity of a polyolefin microporous membrane of the present invention is preferably 30 to 60%. Further preferably, the porosity is 40 to 60%.

From the viewpoint of obtaining the mechanical strength and the membrane resistance in good balance, the Gurley number (JIS P 8117) of a polyolefin microporous membrane of the present invention is preferably 50 to 500 sec/100 cc.

From the viewpoint of the load characteristics of non-aqueous secondary battery, the membrane resistance of a polyolefin microporous membrane of the present invention is preferably 0.5 to 5 ohm·cm$^2$.

The penetration strength of a polyolefin microporous membrane of the present invention is preferably 250 g or higher. When the penetration strength is 250 g or higher, in the production of a non-aqueous secondary battery, the generation of pinholes or the like due to unevenness of electrodes, impact or the like is prevented and a short circuit in the non-aqueous secondary battery can be avoided.

The tensile strength of a polyolefin microporous membrane of the present invention is preferably 10 N or higher. When the tensile strength is 10 N or higher, the breakage of a separator can be prevented when the separator is wound in the production of a non-aqueous secondary battery.

The shutdown temperature of a polyolefin microporous membrane of the present invention is 130 to 150° C. The term "shutdown temperature" refers to the temperature at which the resistance value is $10^3$ ohm·cm$^2$. When the shutdown temperature is 130° C. or higher, the occurrence of a shutdown phenomenon at a low temperature is prevented as well as, a so-called meltdown phenomenon in which polyolefin microporous membrane is completely melt to cause a so-called short circuit phenomenon can be effectively prevented. When the shutdown temperature is 150° C. or lower, a safety function at a high temperature can be expected. The preferred shutdown temperature is 135 to 145° C.

The heat shrinkage ratio of a polyolefin microporous membrane of the present invention at 105° C. is preferably 5 to 40%. When the heat shrinkage ratio is in this range, a separator for non-aqueous secondary battery obtained by processing a polyolefin microporous membrane has balanced shape stability and shutdown properties.

[Method of Producing Polyolefin Microporous Membrane]

The production method of the polyolefin microporous membrane of the present invention is not particularly restricted, and preferably, specifically includes the following processes (1) to (6). Polyolefin which is used as the raw material is as described above.

(1) Preparation of Polyolefin Solution

A solution in which polyolefin is dissolved in a solvent is prepared (a drawing process). At this time, the solution may be prepared by mixing the solvent. Examples of the solvent include paraffin, liquid paraffin, paraffin oil, mineral oil, castor oil, tetralin, ethylene glycol, glycerin, decaline, toluene, xylene, diethyltriamine, ethyldiamine, dimethyl sulphoxide and hexane. From the viewpoint of controlling the degree of crystallinity, a mixed solvent containing a volatile solvent and a nonvolatile solvent is preferred. Examples of the volatile solvent include solvents having a boiling point lower than 300° C. at atmospheric pressure, such as decaline, toluene, xylene, diethyltriamine, ethyldiamine, dimethyl sulphoxide, hexane, tetralin, ethylene glycol and glycerin. Examples of the nonvolatile solvent include solvents having a boiling point of 300° C. or higher at atmospheric pressure, such as paraffin, liquid paraffin, paraffin oil, mineral oil and castor oil. As the mixed solvent, the combination of decaline and paraffin is preferred.

When a mixed solvent composed of a volatile solvent and a non-volatile solvent is used, the mixed solvent is preferably added in an amount of from 65 to 99 parts by mass with respect to 100 parts of the total amount of polyolefin and the mixed solvent.

The concentration of the polyolefin in the polyolefin solution is preferably 1 to 35% by mass, and more preferably 10 to 30% by mass. When the concentration of polyolefin is 1% by mass or higher, a gel composition obtained by cold gelation is hard to deform since the gel composition can be maintained so as not to highly swell by the solvent, which provides good handling properties. On the other hand, when the concentration of polyolefin is 35% by mass or lower, the discharge rate can be maintained since the pressure during extrusion can be restrained, which provide excellent productivity. Orientation in the extrusion process is less likely to proceed, which has advantage in securing drawability or uniformity.

Here, the polyolefin contains an ultra-high molecular weight polyethylene having a weight-averaged molecular weight of 1,000,000 or higher and a high-density polyethylene having a density of 0.942 g/cm$^3$.

In order to obtain the physical properties of crystal of the present invention, the kneading temperature in preparing a polyolefin solution which is a source is preferably from 190 to 220° C. The kneading temperature is further preferably 195 to 208° C.

(2) Extrusion of Polyolefin Solution

The prepared solution is kneaded with a monoaxial extruder or a biaxial extruder, and extruded at a temperature from the melting point to the melting point +60° C. through a T-die or I-die (extrusion process). Preferably, a biaxial extruder is employed. Subsequently, the extruded solution is allowed to pass through a chill roll or a cooling bath to be cooled and form a gel composition. In this case, it is preferred that the extruded solution be quenched to a temperature below the gelation temperature to be gelled.

(3) Removing Solvent

Next, the volatile solvents are removed from the gel composition (the first solvent removal process). When a volatile solvent is used, the solvent can also be removed from the gel composition by evaporating by heating or the like which is also served as a pre-heating process. When a nonvolatile solvent is used, the solvent can be removed by, for example, squeezing out by applying a pressure. There is not necessarily a need to completely remove the solvents.

(4) Drawing of Gel Composition

After removing solvents, the gel composition is drawn (drawing process). Here, prior to the drawing process, a relaxing process may be performed. In the drawing process, the gel molding is heated, and biaxially drawn at a predetermined magnification by using a normal tenter method, a roll method, a rolling method or a combination thereof. The biaxial drawing may be performed simultaneously or successively. The drawing may be performed in longitudinal multistep, or three- or four-step.

The drawing temperature is preferably from 90° C. to the melting point of the polyolefin, and further preferably from 100 to 120° C. When the heating temperature exceeds the melting point, the gel molding melts, and therefore a drawing cannot be performed. When the heating temperature is less than 90° C., the gel molding softens insufficiently and a membrane breakage during drawing tends to occur, whereby a drawing at a high magnification may be difficult.

The drawing magnification varies depending on the thickness of the original fabric, and is at least two times or larger, and preferably 4 to 20 times in one axis direction. In particular, from the viewpoint of controlling crystal parameters, it is preferred that the drawing magnification be 4 to 10 times in the machine direction, and 6 to 15 times in the direction perpendicular to the machine direction.

After the drawing, a heat fixation is performed as required to provide a heat dimensional stability.

(5) Extraction and Removal of Solvent

The gel composition after drawing is immersed in an extraction solvent to extract and remove a nonvolatile solvent (the second solvent removal process). Examples of extraction solvent include easily volatile solvent such as hydrocarbons such as pentane, hexane, heptane, cyclohexane, decaline and tetralin; chlorinated hydrocarbons such as methylene chloride, carbon tetrachloride and methylene chloride; fluorohydrocarbons such as trifluoroethane; and ethers such as diethyl ether and dioxane. These solvents are appropriately selected depending on the nonvolatile solvent which is used for dissolving the polyolefin composition, and may be used alone or in combination. As for the extraction of the solvent, the solvent in the microporous membrane is removed to less than 1% by mass.

(6) Annealing of Microporous Membrane

The microporous membrane is heat set by annealing. The annealing is performed at from 80 to 150° C. From the viewpoint that the microporous membrane has a predetermined heat shrinkage ratio in the present invention, the annealing temperature is preferably from 115 to 135° C.

[Separator for Non-Aqueous Secondary Battery]

(Separator for Non-Aqueous Secondary Battery of First Embodiment)

The separator for non-aqueous secondary battery of the first embodiment of the present invention is a separator for non-aqueous secondary battery including the above-mentioned polyolefin microporous membrane and a heat-resistant porous layer(s) containing heat resistant resin layered on one side or both sides of the polyolefin microporous membrane.

By such a separator for non-aqueous secondary battery, a shutdown function can be obtained by the polyolefin microporous membrane, and at the same time, since polyolefin is retained even at a temperature higher than the shutdown temperature by the heat-resistant porous layer, a meltdown is less likely to occur, whereby safety at a high temperature can be secured. Therefore, by the separator for non-aqueous secondary battery, a non-aqueous secondary battery having an excellent safely can be obtained.

In the separator for non-aqueous secondary battery, from the viewpoint of energy density of non-aqueous secondary battery, the whole membrane thickness is preferably 30 µm or smaller.

From the viewpoint of the permeability, the mechanical strength and the handling properties, the porosity of the separator for non-aqueous secondary battery is preferably 30 to 70%. The porosity is more preferably 40 to 60%.

From the viewpoint of improved balance between the mechanical strength and the membrane resistance, the Gurley number (JIS P8117) of the separator for non-aqueous secondary battery is preferably 100 to 500 sec/100 cc.

From the viewpoint of the load characteristics of non-aqueous secondary battery, the membrane resistance of the separator for non-aqueous secondary battery is preferably 1.5 to 10 ohm·cm$^2$.

The penetration strength of the separator for non-aqueous secondary battery is preferably 250 to 1000 g. When the penetration strength is 250 g or larger, pinholes or the like due to unevenness of electrodes, impact or the like are not likely to be generated when a non-aqueous secondary battery is produced, and the generation of a short circuit of the non-aqueous secondary battery can be restrained.

From the viewpoint of the resistance to the breakage when a separator is wound when producing a non-aqueous secondary battery, the tensile strength of separator for non-aqueous secondary battery is preferably 10 N or higher.

The shutdown temperature of the separator for non-aqueous secondary battery is preferably 130 to 155° C. When the shutdown temperature is 130° C. or higher, a meltdown does not occur at a low temperature, which is highly safe. On the other hand, when the shutdown temperature is 155° C. or lower, safety at a high temperature can be expected. The shutdown temperature is more preferably 135 to 150° C.

The heat shrinkage ratio of the separator for non-aqueous secondary battery at 105° C. is preferably 0.5 to 10%. When the heat shrinkage ratio is in this range, the separator for non-aqueous secondary battery has a good balance of the shape stability and the shutdown properties. The heat shrinkage ratio is more preferably 0.5 to 5%.

(Heat-Resistant Porous Layer)

In the separator for non-aqueous secondary battery, examples of the heat-resistant porous layer include layers having a porous structure such as microporous membrane-shaped, nonwoven fabric-shaped, paper-shaped or other three-dimensional network-shaped structure. As the heat-resistant porous layer, from the viewpoint of obtaining more excellent heat resistance, microporous membrane-shaped layer is preferred. The term "microporous membrane-shaped layer" means a layer which has a large number of micropores inside and has a structure in which these micropores are connected to each other, wherein gases or liquids can pass from one side of the layer to the other side of the layer.

The term "heat resistance" means characteristics in which melting or decomposition does not occur in the temperature region lower than 200° C.

The heat-resistant porous layer may be on both sides or one side of the polyolefin microporous membrane. From the viewpoint of the handling properties, the durability and the inhibitory effect of the heat shrinkage of the separator, the heat-resistant porous layer is preferably on both sides of the polyolefin microporous membrane.

In order to fix a heat-resistant porous layer on a substrate, the method in which the heat-resistant porous layer is formed directly on the substrate by coating is preferred. Other methods such as a method in which a sheet of a separately produced heat-resistant porous layer is adhered to a substrate by an adhesive or the like, or a method of thermal fusion bonding or pressure bonding can also be employed.

When the heat-resistant porous layer is formed on both sides of the polyolefin microporous membrane, the total of the thicknesses of the heat-resistant porous layers is preferably 3 µM to 12 µm. When the heat-resistant porous layer is formed only on one side of the polyolefin microporous membrane, the thickness of the heat-resistant porous layer is preferably 3 µm to 12 µm. Such a range of the membrane thickness is preferred also from the viewpoint of the effect of preventing liquid depletion.

From the viewpoint of the effect of preventing liquid depletion, the porosity of the heat-resistant porous layer is preferably in the range of 30 to 90%. The porosity is more preferably 30 to 70%.

—Heat Resistant Resin—

The heat resistant resin used in the present invention is suitably a polymer having a melting point of 200° C. or higher, or a polymer not having a melting point and having a decomposition temperature of 200° C. or higher. Preferred examples of such a heat resistant resin favorably include at least one resin selected from the group consisting of fully aromatic polyamides, polyimides, polyamide imides, polysulfones, polyketones, polyetherketones, polyether imides and cellulose. In particular, from the viewpoint of the durability, fully aromatic polyamides are suitable, and from the viewpoint of the easiness of forming a porous layer and excellence in the oxidation and reduction resistance, polymethaphenylene isophthalamide which is a meta-type fully aromatic polyamide is further preferred.

—Inorganic Filler—

In the present invention, the heat-resistant porous layer preferably contains an inorganic filler. The inorganic filler is not particularly limited and specific examples thereof suitably include metal oxides such as alumina, titania, silica and zirconia; metal carbonates such as calcium carbonate; metal phosphates such as calcium phosphate; and metal hydroxides such as aluminium hydroxide and magnesium hydroxide. From the viewpoint of elution of impurities and the durability, such an inorganic filler is preferably highly crystalline.

As the inorganic filler, those which undergo an endothermic reaction at 200 to 400° C. are preferred. In a non-aqueous secondary battery, an exotherm accompanied by decomposition of a positive electrode is thought to be the most dangerous, and the decomposition occurs at about 300° C. For this reason, when the endothermic reaction generation temperature is in the range of 200 to 400° C., the inorganic filler is effective for preventing the endotherm of the non-aqueous secondary battery.

Examples of the inorganic filler which undergoes an endothermic reaction at 200 to 400° C. include an inorganic filler composed of metal hydroxides, borate compounds or clay minerals. Specific examples of the inorganic filler include aluminium hydroxide, magnesium hydroxide, calcium aluminate, dawsonite and zinc borate. Aluminium hydroxide, dawsonite and calcium aluminate undergo an dehydration reaction at 200 to 300° C.; magnesium hydroxide and zinc borate undergo an dehydration reaction at 300 to 400° C. Therefore, at least one of these inorganic fillers is preferably used. Among others, from the viewpoint of the effect of improving a flame resistance, the handling properties, the antistatic effect and the effect of improving the durability of a battery, metal hydroxides are preferred, and particularly, aluminium hydroxide or magnesium hydroxide is preferred.

The above-mentioned inorganic fillers are used alone or two or more of these may be used in combination. These flame resistant inorganic fillers can be used by mixing as appropriate other inorganic fillers, for example, metal oxides such as alumina, zirconia, silica, magnesia and titania; metal nitrides; metal carbides; and metal carbonates.

In the present invention, from the viewpoint of the anti-short circuit properties at a high temperature and the formability, the average particle size of the inorganic filler is preferably 0.1 µm to 2 µm.

In the present invention, from the viewpoint of the effect of improving the heat resistance, the permeability and the handling properties, the content of the inorganic filler in the heat-resistant porous layer is preferably 50 to 95% by mass.

When the heat-resistant porous layer is microporous membrane-shaped, the inorganic filler in the heat-resistant porous layer may exist in a state where the inorganic filler is trapped in the heat resistant resin; and when the heat-resistant porous layer is a nonwoven fabric or the like, the inorganic filler in the heat-resistant porous layer may exist in the constituent fibers or may be fixed on the surface of the nonwoven fabric or the like by a binder such as resins.

(Method of Producing Heat-Resistant Porous Layer)

In the present invention, the method of forming a heat-resistant porous layer is not particularly restricted, and the method can include, for example, the following processes (1) to (5).

In order to fix a heat-resistant porous layer on a polyolefin microporous membrane, the method in which the heat-resistant porous layer is formed directly on the polyolefin microporous membrane by coating is preferred. Other methods such as a method in which a sheet of a separately produced heat-resistant porous layer is adhered to a polyolefin microporous membrane by an adhesive or the like, or a method of thermal fusion bonding or pressure bonding can also be employed.

(1) Preparing of Slurry for Coating

A heat resistant resin is dissolved in a solvent to produce a slurry for coating. Although the solvent may be any solvent as long as the solvent dissolves the heat resistant resin and is not particularly restricted, specifically, polar solvents are preferred, and examples thereof include N-methylpyrrolidone, dimethylacetamide, dimethylformamide and dimethyl sulphoxide. In addition to these polar solvents, examples of the solvent also include a solvent which is a poor solvent to the heat resistant resin. By applying such a poor solvent, a micro phase separation structure is induced, which facilitates making a porous structure when the heat-resistant porous layer is formed. As the poor solvent, alcohols are suitable, and particularly polyhydric alcohols such as glycols are suitable.

The concentration of the heat resistant resin in the slurry for coating is preferably 4 to 9% by mass. As required, an inorganic filler is dispersed to form a slurry for coating. In the course of dispersing the inorganic filler in the slurry for coating, when the dispersibility of the inorganic filler is not favorable, a method for improving the dispersibility by the surface treatment of the inorganic filler by a silane coupling agent or the like is also applicable.

(2) Slurry Coating

A slurry is coated on at least one side of the polyolefin microporous membrane. When heat-resistant porous layers are formed on both sides of the polyolefin microporous membrane, from the viewpoint of reduction of processes, it is preferred that the heat-resistant porous layers are coated on both sides of the substrate at the same time. Examples of a method of coating the slurry for coating include a knife coater method, a gravure coater method, Meyer bar method, a die coater method, a reverse roll coater method, a roll coater method, a screen printing method, an inkjet method and a spray method. Among these, from the viewpoint of forming the coating layer uniformly, the reverse roll coater method is suitable. When the heat-resistant porous layers are coated on both sides of the polyolefin microporous membrane at the same time, for example, a method can be employed in which the polyolefin microporous membrane is allowed to pass between a pair of Meyer bars to apply an excess amount of slurry for coating on both sides and a precise measurement is performed by allowing the resultant membrane to pass between a pair of reverse roll coater to scrape an excess amount of slurry.

(3) Coagulation of Slurry

By processing the polyolefin microporous membrane coated with a slurry for coating with a coagulation liquid capable of coagulating a heat resistant resin, the heat resistant resin is coagulated to form a heat-resistant porous layer.

Examples of a method of processing using a coagulation liquid include a method in which a coagulation liquid is sprayed on the surface on which slurry for coating is coated, and a method in which a polyolefin microporous membrane coated with a slurry for coating is immersed in a bath containing a coagulation liquid (coagulation bath). Here, when a coagulation bath is installed, the coagulation bath is preferably installed at a lower position of the coating apparatus.

The coagulation liquid is not particularly restricted as long as the coagulation liquid can coagulate a heat resistant resin, and is preferably water or a solvent used for slurry mixed with an appropriate amount of water. Here, the amount of water mixed is preferably 40 to 80% by mass based on the coagulation liquid. When the amount of water is 40% by mass or higher, time required for the heat resistant resin to coagulate is not too long. A portion where coagulation is not sufficient is not generated. On the other hand, when the amount of water is 80% by mass or lower, the coagulation of the surface of the heat resistant resin layer in contact with a coagulation liquid proceeds at an appropriate speed, and the surface thereof is made sufficiently porous and the degree of crystallization is appropriate. Further, the cost of recovering the solvent can be kept low.

(4) Removal of Coagulation Liquid

The coagulation liquid used for the coagulation of the slurry is removed by washing with water.

(5) Dry

Water is removed by drying from a sheet of the polyolefin microporous membrane on which a heat resistant resin coating layer is formed. The method of drying is not particularly restricted, and the drying temperature is preferably 50 to 80° C. When a high drying temperature is applied, in order to avoid generating a dimension change due to heat shrinkage, a method of allowing to be in contact with a roll is preferably applied.

(Separator for Non-Aqueous Secondary Battery of Second Embodiment)

The separator for non-aqueous secondary battery of the second embodiment of the present invention is a separator for non-aqueous secondary battery including the above-mentioned polyolefin microporous membrane and an adhesive porous layer(s) containing a vinylidene fluoride resin layered on one side or both sides of the polyolefin microporous membrane.

By such a separator for non-aqueous secondary battery, due to layering of the adhesive porous layers containing a vinylidene fluoride resin on one side or both sides of the polyolefin microporous membrane, the adherence between the separator and the electrodes increases. For this reason, in addition to the mechanical strength, the shutdown properties and the effect of preventing liquid depletion, the adhesive porous layer exerts an excellent ion permeability and an electrolyte retention. By this, the cycle properties of the battery significantly improve.

(Adhesive Porous Layer)

The adhesive porous layer has a large number of micropores inside and has a structure in which these micropores are connected to each other, wherein gases or liquids can pass from one side of the layer to the other side of the layer.

The adhesive porous layer may be on both sides or one side of the polyolefin microporous membrane. From the viewpoint of preventing a curl of the separator and from the viewpoint that both sides of the separator adhere to the positive and negative electrodes respectively whereby the cycle properties of the battery further improve, the adhesive porous layer is preferably on both sides of the polyolefin microporous membrane rather than only on one side of the polyolefin microporous membrane.

From the viewpoint of adhesiveness to the electrodes and increase in capacity of the battery, the membrane thickness of the adhesive porous layer is preferably 1 μm to 10 μm per one side.

From the viewpoint of the ion permeability and the electrolyte retention, the porosity of the adhesive porous layer is preferably 60 to 80%.

<Vinylidene Fluoride Resin>

The vinylidene fluoride resin contained in the adhesive porous layer is preferably at least one of (i) and (ii) below:

(i) polyvinylidene fluoride (ii) a copolymer composed of vinylidene fluoride and at least one of hexafluoropropylene, chlorotrifluoroethylene, hexafluoroethylene and ethylene.

In particular, as the vinylidene fluoride resin, from the viewpoint of adhesiveness to the electrodes, a copolymer of vinylidene fluoride and hexafluoropropylene is preferred.

(Method of Producing Adhesive Porous Layer)

In the present invention, the method of forming an adhesive porous layer is not particularly restricted, and for example, the wet film forming method described below is employed to form an adhesive porous layer. The wet film forming method is a film forming method in which a dope obtained by blending and melting a vinylidene fluoride resin, an organic solvent which dissolves the vinylidene fluoride resin and which is compatible with water and a phase separating agent (gelation agent or boring agent) is coated on the polyolefin microporous membrane, and then immersed in an aqueous coagulation bath to coagulate the vinylidene fluoride resin, followed by washing with water and drying to form a porous layer. This wet film forming method is suitable because the porosity and the pore size of adhesive porous layer can be easily controlled by the composition of the dope and the composition of the coagulation bath.

As the organic solvent, any solvent can be suitably used as long as the solvent can dissolve a vinylidene fluoride resin and is compatible with water. Specific examples of the organic solvent suitably include N-methylpyrrolidone (NMP), N,N-dimethylacetamide (DMAc), N,N-dimethylformamide (DMF), dimethyl sulphoxide (DMSO) and acetonitrile, and these may be mixed to be used. The concentration of vinylidene fluoride resin in the dope is preferably 5 to 25% by mass.

As the phase separating agent, any agent can be used as long as the agent is a poor solvent to the vinylidene fluoride resin and compatible with water. Specific examples of the phase separating agent suitably include water and alcohols, and particularly suitably include propylene glycols containing polymer and polyhydric alcohols such as ethylene glycol, tripropylene glycol (TPG), 1,3-butanediol, 1,4-butanediol, polyethylene glycol monoethyl ether, methanol, ethanol and glycerin. The concentration of the phase separating agent in the dope is preferably 0 to 60% by mass based on the mixed solvent of the organic solvent and the phase separating agent.

As the coagulation bath, a mixed liquid of water, and the organic solvent and the phase separating agent used for the dope is suitably used. The percentage of water is preferably 30 to 90% by mass. The quantitative ratio of the organic solvent and the phase separating agent preferably corresponds to the quantitative ratio thereof in the dope at the point of producing.

In the present invention, the adhesive porous layer can also be formed by the dry film forming method described below. The dry film forming method is a film forming method in which a dope in a solution state obtained by blending and melting a vinylidene fluoride resin, a volatile solvent which dissolves the vinylidene fluoride resin and a plasticizer is coated on a polyolefin microporous membrane, and then the volatile solvent is removed by drying, followed by extracting the plasticizer with a volatile solvent which dissolves a plasticizer and does not dissolve a vinylidene fluoride resin and drying to form a porous layer.

[Non-Aqueous Secondary Battery]

The non-aqueous secondary battery of the present invention includes a positive electrode, a negative electrode and a separator for non-aqueous secondary battery having the above-mentioned configuration and being disposed between the positive electrode and the negative electrode, and is configured such that an electromotive force is obtained by doping and dedoping lithium. The non-aqueous secondary battery has a structure in which battery elements which are a negative electrode and a positive electrode opposing via a separator are impregnated with an electrolyte and these elements are enclosed in an outer package.

The negative electrode has a structure in which a negative electrode mixture composed of a negative-electrode active material, an auxiliary conductive agent and a binder is formed on a collecting body. Examples of the negative-electrode active material include a material on which lithium can be electrochemically doped, such as carbon materials, silicon, aluminium, tin or Wood's metal. In particular, from the viewpoint of taking advantage of the effect of preventing liquid depletion due to the separator of the present invention, as the negative-electrode active material, those having a volume change of 3% or higher during the process of dedoping lithium are preferably used. Examples of such a negative-electrode active material include Sn, SnSb, $Ag_3Sn$, artificial graphite, graphite, Si, SiO and $V_5O_4$.

Examples of auxiliary conductive agent include carbon materials such as acetylene black and Ketjenblack. The binder is composed of an organic polymer such as polyvinylidene fluoride or carboxymethylcellulose. Examples of the collecting body can include copper foil, stainless foil and nickel foil.

The positive electrode has a structure in which a positive electrode mix composed of a positive-electrode active material, an auxiliary conductive agent and a binder is formed on a collecting body. Examples of the positive-electrode active material include lithium-containing transition metal oxides, such as $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$ and $LiAl_{0.25}Ni_{0.75}O_2$. In particular, from the viewpoint of taking advantage of the effect of preventing liquid depletion due to the separator of the present invention, as the positive-electrode active material, those having a volume change of 1% or higher during the process of dedoping lithium are preferably used. Examples of such a positive-electrode active material include $LiMn_2O_4$, $LiCoO_2$, $LiNiO_2$, $LiCo_{0.5}Ni_{0.5}O_2$ and $LiAl_{0.25}Ni_{0.75}O_2$. Examples of auxiliary conductive agent include carbon materials such as acetylene black and Ketjenblack. The binder is composed of an organic polymer such as polyvinylidene fluoride. Examples of the collecting body can include aluminum foil, stainless foil and titanium foil. Examples of the collecting body can include aluminum foil, stainless foil and titanium foil.

The electrolyte has a constitution in which a lithium salt is dissolved in a non-aqueous solvent. Examples of the lithium salt include $LiPF_6$, $LiBF_4$ and $LiClO_4$. Examples of the non-aqueous solvent include propylenecarbonate, ethylene carbonate, dimethylcarbonate, diethylcarbonate, ethylmethylcarbonate, γ-butyrolactone and vinylene carbonate. These may be used alone or mixed to be used.

Examples of the outer package include a metal can or aluminum laminated packaging. Examples of the shape of battery include square shape, cylinder shape and coin shape, and the separator of the present invention can suitably apply any of these shapes.

EXAMPLES

In the following, the present invention will now be described more specifically by way of Examples, but not limited thereto, without deviating from the spirit of the invention.

[Measuring Method]

The each value in the Examples was determined according to the following methods.

(1) Membrane Thickness

The membrane thicknesses of the polyolefin microporous membrane and the separator for non-aqueous secondary battery were calculated by measuring the thicknesses at 20 points by a contact type film thickness meter (manufactured by Mitutoyo Corporation) and averaging the measured values. Here, a contact probe having a cylindrical shape and a diameter of the bottom surface of 0.5 cm was used.

(2) Unit Weight

The unit weights, which are weight per 1 $m^2$, of the polyolefin microporous membrane and the separator for non-aqueous secondary battery were determined by measuring the weight of a sample cut out in 10 cm×10 cm and dividing the measured mass by the area.

(3) Porosity

The porosities of the polyolefin microporous membrane and the separator for non-aqueous secondary battery were calculated by the following formula:

$$\epsilon = \{1 - Ws/(ds \cdot t)\} \times 100$$

Here, ε: porosity (%), Ws: unit weight (g/$m^2$), ds: real density (g/$cm^3$), and t: membrane thickness (m).

(4) Gurley Number (Air Permeability)

The Gurley numbers of the polyolefin microporous membrane and the separator for non-aqueous secondary battery were determined based on JIS P 8117.

(5) Membrane Resistance

The membrane resistances of the polyolefin microporous membrane and the separator for non-aqueous secondary battery were determined by the following method.

A sample having a size of 2.6 cm×2.0 cm is cut out. The cut out sample is immersed in a 3% by mass methanol solution (methanol: manufactured by Wako Pure Chemical Industries, Ltd.) in which nonionic surfactant (Emulgen 210P manufactured by Kao Corporation) is dissolved, and air dried. Aluminum foil having a thickness of 20 μm is cut out in 2.0 cm×1.4 cm and a lead tab is attached thereto. Two sheets of such aluminum foils are prepared and the cut out sample is sandwiched between the aluminum foils so as not to short the aluminum foils. The sample is impregnated with 1M $LiBF_4$-propylenecarbonate/ethylene carbonate (mass ratio: 1/1) which is an electrolyte. The resultant was enclosed with a reduced pressure in an aluminum laminated packaging such that the tab is outside the aluminum packaging. Such cells are produced such that one, two or three sheets of separators are in the aluminum foils. The cell is placed in a thermostat bath at 20° C., and the resistance of the cell is measured by an alternating current impedance method with an amplitude of 10 mV and a frequency of 100 kHz. The measured resistance value of the cell is plotted against the number of separators, and the plots are linearly approximated to obtain the inclination. This inclination was multiplied by the electrode area, 2.0 cm×1.4 cm to obtain the membrane resistance per one sheet of separator (ohm·cm$^2$).

(6) Penetration Strength

The penetration strengths of the polyolefin microporous membrane and the separator for non-aqueous secondary battery were determined by performing a penetration test by using a KES-G5 handy compression tester manufactured by Kato tech Co., Ltd. with the radius of curvature of the end of the needle of 0.5 mm and a penetration speed of 2 mm/sec, and measuring the maximum penetration load. Here, the samples were fixed on a metallic flask having a hole of φ 11.3 mm (sample holder) with a packing made of silicon rubber sandwiched.

(7) Tie Molecule Volume Fraction·Tensile Strength

The tensile strengths and the tensile modulus of the polyolefin microporous membrane and the separator for non-aqueous secondary battery were measured with a load-cell load of 5 kgf and a distance between chucks of 50 mm, using samples cut out in 10×100 mm and a tensile tester (RTC-1225A manufactured by A&D Company, Limited). A tie molecule volume fraction was calculated from the tensile modulus obtained here by using the following formula. The tensile modulus of the sample was a value obtained by dividing the measured value by (100−porosity)/100, presuming the state that the porosity of the polyolefin is 0%.

tie molecule volume fraction={(1−0.01×degree of crystallinity)×elastic modulus of sample}/(theoretical elastic modulus−0.01×degree of crystallinity×elastic modulus of sample})×100

(8) Degree of Crystallinity

The polyolefin microporous membrane was cut out with a weight of 5±1 mg and the melting energy thereof was measured by using DSC (TA-2920 manufactured by TA Instruments Japan Inc.). DSC was performed, setting the rate of temperature increase at 2° C./min.

As in the formula below, the degree of crystallinity of polyolefin was obtained by the ratio of the melting energy measured by DSC and the theoretical melting energy of the crystal. As the theoretical melting energy, 289 J/g·K was employed.

degree of crystallinity (%)=(measured melting energy)/(theoretical melting energy)×100

(9) Number Average Molecular Weight

The number average molecular weight of the polyolefin used for producing a polyolefin microporous membrane was measured by GPC (ALC/GPC 150-C plus type, manufactured by Waters). When two or more polyolefins are mixed to be used, the number average molecular weight of the mixture obtained by the mixing was measured.

(10) Number of Short Chain Branches

The number of short chain branches of a polyolefin microporous membrane was measured by an infrared spectrometer (Magna-750 manufactured by Nicolet Instruments Corporation).

(11) Shutdown Temperature (SD Temperature)

The shutdown temperatures of the polyolefin microporous membrane and the separator for non-aqueous secondary battery were obtained by the following method.

First, a sample was punched out in a diameter of 19 mm and the punched out sample was immersed in a methanol solution (methanol: manufactured by Wako Pure Chemical Industries, Ltd.) in which 3% by mass of nonionic surfactant (Emulgen 210P, manufactured by Kao Corporation) was dissolved, and air dried. This sample was sandwiched with SUS plates having a diameter of 15.5 mm and the sample was impregnated with 1M $LiBF_4$ propylenecarbonate/ethylene carbonate (mass ratio: 1/1) (KISHIDA CHEMICAL Co., Ltd.) which is an electrolyte. The resultant was enclosed in a 2032 type coin cell. Lead wires were connected to the coin cell and a thermocouple was attached thereto and the coin cell was placed in an oven. The temperature inside the coin cell was increased at a rate of temperature increase of 1.6° C./min. and at the same time, the resistance of the cell was measured by an alternating current impedance method with an amplitude of 10 mV and a frequency of 100 kHz. The time when the resistance value was $10^3$ ohm·cm$^2$ or higher was regard as a shutdown, and the temperature at this time was defined as a shutdown temperature.

(12) Heat Resistance

The heat resistance of the separator for non-aqueous secondary battery was evaluated depending on whether or not the resistance value was maintained at $10^3$ ohm·cm$^2$ or higher until the temperature of the cell became 200° C. from the occurrence of a shutdown when the shutdown temperature in the above (11) was measured. When the resistance value was maintained at $10^3$ ohm·cm$^2$ or higher, the resistance value was judged as good (○); and when the resistance value became lower than $10^3$ ohm·cm$^2$, the resistance value was judged as not good (×).

(13) Heat Shrinkage Ratio

The heat shrinkage ratios of the polyolefin microporous membrane and the separator for non-aqueous secondary battery were measured by heating the sample at 105° C. for 1 hour. The measurement direction is in the machine direction.

(14) Recovery Rate after Pressurization

By measuring the recovery rate after pressurization, the effect of preventing liquid depletion of the polyolefin microporous membrane and the separator for non-aqueous secondary battery were evaluated.

First, a sample was cut out in a size of 2.6 cm×2.0 cm. The cut out sample was immersed in a methanol solution in which 3% by mass of nonionic surfactant (Emulgen 210P manufactured by Kao Corporation) was dissolved, and air dried. Aluminum foil having a thickness of 20 μM was cut out in 2.0 cm×1.4 cm and a lead tab was attached thereto. Two sheets of such aluminum foils were prepared and the cut out separator was sandwiched between the aluminum foils so as not to short the aluminum foils. For the electrolyte, an electrolyte in which 1M $LiBF_4$ was dissolved in a solvent in which propylene carbonate and ethylene carbonate are mixed at a mass ratio of 1/1 was used, and the sample was impregnated with this electrolyte. The resultant was enclosed with a reduced pressure in an aluminum laminated packaging such that tab was outside the aluminum packaging. The resistance of the cell was measured by an alternating current impedance method, with an amplitude of 10 mV and a frequency of 100 kHz to obtain the resistance value (A) (ohm·cm$^2$) before pressurization. The cell was then pressurized by a plate press at 40 MPa for 5 minutes, followed by releasing the pressure. This procedure was repeated 5 times and the resistance value (B) (ohm·cm$^2$) of the cell in which a pressure was released after the pressurization was measured: The recovery rate after pressurization was then calculated by the formula below. The higher the recovery rate after pressurization, the more excellent the effect of preventing liquid depletion.

recovery rate after pressurization (%)=resistance value (B)/resistance value (A)×100

(15) Weight-Averaged Molecular Weight of Polyolefin

The molecular weight of the polyolefin was measured by gel permeation chromatography (GPC) below.

To 15 mg of a sample, 20 ml of a mobile phase for GPC measurement was added to dissolve the sample completely at 145° C., and then the resultant was filtrated through a stainless sintered filter (pore size: 1.0 µm). 400 µl of the filtrate was injected into the apparatus to be subjected to a measurement, and the weight-averaged molecular weight of the sample was determined.

Apparatus: Gel Permeation Chromatograph Alliance GPC2000 (manufactured by Waters)

Column: TSKgel GMH6-HT×2+TSKgel GMH6-HT×2, manufactured by Tosoh Corporation

Column temperature: 140° C.

Mobile phase: o-dichlorobenzene

Detector: Differential refractive index detector (RI)

Molecular weight calibration: monodispersed polystyrene (manufactured by Tosoh Corporation)

Example 1

As a polyethylene powder, GUR2126 (weight-averaged molecular weight: 4,150,000, number average molecular weight: 800,000, melting point: 141° C.; manufactured by Ticona corporation) which is ultra-high molecular weight polyethylene and GURX143 (weight-averaged molecular weight: 560,000, number average molecular weight: 50,000, melting point: 135° C.; manufactured by Ticona corporation) which is high-density polyethylene were used. A polyethylene solution was produced by making GUR2126 and GURX143 20:80 (mass ratio) and dissolving them in a mixed solvent of liquid paraffin (Smoil P-350, manufactured by Matsumura Oil Research Corp; boiling point: 480° C.) and decalin (manufactured by Wako Pure Chemical Industries, Ltd.; boiling point: 193° C.). The composition of the polyethylene solution is as follows: polyethylene:liquid paraffin: decalin=30:67.5:2.5 (mass ratio). Here, the polyethylene solution was kneaded at 197° C.

This polyethylene solution was extruded from a die at 148° C. and cooled in a water bath to produce a gel tape (base tape).

The obtained base tape was dried at 60° C. for 8 minutes and 95° C. for 15 minutes, and this base tape was drawn by biaxial drawing in which longitudinal drawing and transverse drawing were sequentially performed. Here, the longitudinal drawing was performed at a drawing ratio of 6 times at a drawing temperature of 90° C., and the transverse drawing was performed at a drawing ratio of 9 times at a drawing temperature of 105° C. After the transverse drawing, a heat fixation was performed at 125° C. Next, the resultant was immersed in a methylene chloride bath to extract liquid paraffin and decalin. Subsequently, the resultant was dried at 50° C. and subjected to an annealing process to obtain a polyolefin microporous membrane. The obtained polyolefin microporous membrane had a structure in which fibril polyolefin was interlaced in a net-like shape, and which constitutes micropores.

The measured results of properties of the obtained polyolefin microporous membrane (membrane thickness, unit weight, porosity, Gurley number, membrane resistance, penetration strength, tensile strength, a variety of physical properties of crystal, shutdown (SD) temperature, heat shrinkage ratio, recovery rate after pressurization) are shown in Table 1 below. The results of polyolefin microporous membranes in Examples and Comparative Examples are also shown in Tables 1 or 2.

Example 2

A polyolefin microporous membrane was obtained in the same manner as in Example 1 except that the polyethylene solution was kneaded at 208° C. and the heat fixation temperature was 130° C.

Example 3

A polyolefin microporous membrane was obtained in the same manner as in Example 1 except that the polyethylene solution was kneaded at 201° C. and the heat fixation temperature was 120° C.

Example 4

A polyolefin microporous membrane was obtained in the same manner as in Example 1 except that GUR2126: GURX143 was adjusted to 30:70 (mass ratio), the polyethylene solution was kneaded at 195° C. and the heat fixation temperature was 132° C.

Example 5

A polyolefin microporous membrane was obtained in the same manner as in Example 4 except that the ratio of GUR2126 and GURX143 was adjusted to 40:60 (mass ratio), and the polyethylene solution was kneaded at 205° C.

Example 6

A polyolefin microporous membrane was obtained in the same manner as in Example 4 except that the ratio of GUR2126 and GURX143 was adjusted to 20:80 (mass ratio), and the polyethylene solution was kneaded at 205° C.

Example 7

A polyolefin microporous membrane was obtained in the same manner as in Example 1 except that SK-PE-20L (melting point: 106° C., manufactured by Seishin Enterprise Co., Ltd.) which is a polyethylene having a low density was further used as polyethylene powder; GUR2126: GURX143: SK-PE-20L was adjusted to 30:60:10 (mass ratio); the polyethylene solution was kneaded at 199° C.; and the heat fixation temperature was 123° C.

Example 8

A polyolefin microporous membrane was obtained in the same manner as in Example 7 except that GUR2126: GURX143: SK-PE-20L was adjusted to 30:70:0 (mass ratio);

the polyethylene solution was kneaded at 202° C.; and the heat fixation temperature was 122° C.

Example 9

A polyolefin microporous membrane was obtained in the same manner as in Example 7 except that GUR2126: GURX143: SK-PE-20L was adjusted to 30:10:60 (mass ratio); the polyethylene solution was kneaded at 200° C.; and the heat fixation temperature was 124° C.

Comparative Example 1

A polyolefin microporous membrane was obtained in the same manner as in Example 1 except that the polyethylene solution was kneaded at 181° C. and the heat fixation temperature was 110° C.

Comparative Example 2

A polyolefin microporous membrane was obtained in the same manner as in Example 1 except that the polyethylene solution was kneaded at 231° C. and the heat fixation temperature was 138° C.

Comparative Example 3

A polyolefin microporous membrane was obtained in the same manner as in Example 4 except that the heat fixation temperature was 138° C. and the polyethylene solution was kneaded at 180° C.

Comparative Example 4

A polyolefin microporous membrane was obtained in the same manner as in Example 4 except that the ratio of GUR2126 and GURX143 was adjusted to 70:30 (mass ratio), and the polyethylene solution was kneaded at 230° C.

Comparative Example 5

A polyolefin microporous membrane was obtained in the same manner as in Example 7 except that GUR2126: GURX143: SK-PE-20L was adjusted to 25:75:0 (mass ratio); the polyethylene solution was kneaded at 185° C.; and the heat fixation temperature was 135° C.

Comparative Example 6

A polyolefin microporous membrane was obtained in the same manner as in Example 7 except that GUR2126: GURX143: SK-PE-20L was adjusted to 30:0:70 (mass ratio); and the polyethylene solution was kneaded at 228° C.

Comparative Example 7

A polyolefin microporous membrane was obtained in the same manner as in Example 1 except that the mixing ratio of GUR2126 and GURX143 was made 10:90 (mass ratio); the composition of the polyethylene solution was as follows: polyethylene:liquid paraffin:decalin=30:45:25 (mass ratio); the polyethylene solution was kneaded at 180° C.; the longitudinal drawing ratio was set to 5.5 times; the transverse drawing ratio was set to 11 times; and after the transverse drawing a heat fixation was performed at 125° C.

Comparative Example 8

A polyolefin microporous membrane was obtained in the same manner as in Comparative Example 7 except that the mixing ratio of GUR2126 and GURX143 was made 30:70 (mass ratio); the concentration of polyethylene was set to 25% by mass; the composition of the polyethylene solution was as follows: polyethylene:liquid paraffin:decalin=25: 37.5:37.5 (mass ratio).

Comparative Example 9

A polyolefin microporous membrane was obtained in the same manner as in Comparative Example 7 except that the mixing ratio of GUR2126 and GURX143 was made 50:50 (mass ratio); the concentration of polyethylene was set to 21% by mass; the composition of the polyethylene solution was as follows: polyethylene:liquid paraffin:decalin=21: 31.5:47.5 (mass ratio).

Comparative Example 10

A polyolefin microporous membrane was obtained in the same manner as in Comparative Example 7 except that the mixing ratio of GUR2126 and GURX143 was made 70:30 (mass ratio); the concentration of polyethylene was set to 17% by mass; the composition of the polyethylene solution was as follows: polyethylene:liquid paraffin:decalin=17:51: 32 (mass ratio).

Comparative Example 11

A polyolefin microporous membrane was obtained in the same manner as in Comparative Example 7 except that the mixing ratio of GUR2126 and GURX143 was made 30:70 (mass ratio); the concentration of polyethylene was set to 25% by mass; the composition of the polyethylene solution was as follows: polyethylene:liquid paraffin:decalin=21: 31.5:47.5 (mass ratio).

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Film thickness | [μm] | 12 | 12 | 12 | 12 | 12 | 12 | 11 | 11 | 11 |
| Unit weight | [g/m$^2$] | 6.3 | 6.4 | 6.3 | 6.2 | 6.0 | 6.2 | 5.5 | 5.6 | 5.6 |
| Porosity | [%] | 42 | 41 | 42 | 43 | 44 | 43 | 44 | 43 | 43 |
| Degree of crystallinity | [%] | 80 | 85 | 60 | 72 | 79 | 62 | 72 | 82 | 60 |
| Tie molecule volume fraction | [%] | 1.4 | 1.5 | 0.7 | 1.4 | 1.5 | 0.7 | 1.2 | 1.5 | 1 |
| Number average molecular weight | ×10$^3$[—] | 30 | 30 | 30 | 50 | 80 | 30 | 50 | 50 | 50 |
| the number of short chain branches | [—] | 1 | 1 | 1 | 1 | 1 | 1 | 2 | 1 | 5 |
| Gurley number | [sec/100 cc] | 176 | 172 | 176 | 181 | 185 | 181 | 169 | 166 | 166 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Membrane resistance | [ohm · cm$^2$] | 1.5 | 1.4 | 1.5 | 1.6 | 1.6 | 1.6 | 1.4 | 1.4 | 1.3 |
| Penetration strength | [g] | 343 | 351 | 343 | 335 | 327 | 335 | 300 | 307 | 307 |
| Tensile strength | [N] | 22 | 23 | 22 | 22 | 23 | 22 | 21 | 22 | 22 |
| SD temperature | [° C.] | 142 | 140 | 141 | 139 | 138 | 139 | 140 | 139 | 140 |
| Heat shrinkage ratio | [%] | 27 | 26 | 25 | 31 | 30 | 32 | 33 | 32 | 34 |
| Recovery rate after pressurization | [%] | 85 | 83 | 79 | 85 | 84 | 83 | 85 | 82 | 84 |

TABLE 2

|  |  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 | Comp. Example 10 | Comp. Example 11 |
|---|---|---|---|---|---|---|---|---|---|---|---|---|
| Film thickness | [μm] | 12 | 12 | 12 | 12 | 11 | 11 | 11.5 | 11.5 | 12 | 14.7 | 10.9 |
| Unit weight | [g/m$^2$] | 6.0 | 6.4 | 6.0 | 6.3 | 5.5 | 5.6 | 6.9 | 6.3 | 7.1 | 7.3 | 6.0 |
| Porosity | [%] | 44 | 41 | 44 | 42 | 44 | 43 | 36 | 36 | 37 | 47 | 41 |
| Degree of crystallinity | [%] | 75 | 70 | 70 | 64 | 86 | 59 | 86 | 87 | 64 | 63 | 86 |
| Tie molecule volume fraction | [%] | 1.8 | 0.5 | 1.8 | 0.6 | 0.8 | 1.8 | 0.6 | 1.1 | 2.1 | 2.2 | 1.2 |
| Number average molecular weight | ×10$^3$[—] | 30 | 30 | 50 | 180 | 40 | 50 | 20 | 50 | 115 | 180 | 50 |
| the number of short chain branches | [—] | 1 | 1 | 1 | 1 | 0.8 | 6 | 1 | 1 | 1 | 1 | 1 |
| Gurley number | [sec/100 cc] | 185 | 172 | 185 | 176 | 169 | 166 | 301 | 306 | 351 | 199 | 250 |
| Membrane resistance | [ohm · cm$^2$] | 1.6 | 1.4 | 1.6 | 1.5 | 1.6 | 1.4 | 2.641 | 2.501 | 2.58 | 1.960 | 2.190 |
| Penetration strength | [g] | 327 | 351 | 327 | 343 | 300 | 307 | 380 | 393 | 475 | 511 | 344 |
| Tensile strength | [N] | 19 | 23 | 19 | 23 | 19 | 23 | 21 | 25 | 24 | 26 | 22 |
| SD temperature | [° C.] | 143 | 148 | 147 | 148 | 145 | 148 | 143 | 144 | 144 | 146 | 144 |
| Heat shrinkage ratio | [%] | 33 | 27 | 27 | 30 | 28 | 33 | 30 | 31 | 27 | 28 | 28 |
| Recovery rate after pressurization | [%] | 40 | 42 | 43 | 4 | 43 | 46 | 55 | 60 | 68 | 65 | 69 |

Example 10

By using the polyolefin microporous membrane obtained in Example 1, a heat-resistant porous layer composed of a heat resistant resin and an inorganic filler was layered thereon to produce a separator for non-aqueous secondary battery of the present invention.

Specifically, as the heat resistant resin, polymethaphenylene isophthalamide (manufactured by TEIJIN TECHNO PRODUCTS LIMITED; CONEX) was employed. This heat resistant resin was dissolved in a mixed solvent of dimethylacetamide (DMAc) and tripropylene glycol (TPG) having a mass ratio of 50:50. In this polymer solution, magnesium hydroxide (manufactured by Kyowa Chemical Industry Co., Ltd., KISUMA-5P, average particle size: 1.0 μm) as the inorganic filler was dispersed to produce a slurry for coating. The concentration of polymethaphenylene isophthalamide in the slurry for coating was adjusted to 5.5% by mass and the mass ratio of polymethaphenylene isophthalamide and the inorganic filler was adjusted to 25:75. Two Meyer bars were faced to each other and a proper amount of the coating liquid was placed between them. Thereafter, a polyolefin microporous membrane was allowed to pass between the Meyer bars on which the coating liquid were placed, and the slurry for coating was coated on the both sides of the polyolefin microporous membrane. Here, the clearance between the Meyer bars were set to 20 μm and as both of two Meyer bars, #6 were employed. This membrane was immersed in a coagulation liquid in the mass ratio of water:DMAc:TPG=50:25:25 at 40° C., and then washed with water and dried. By this, a separator for non-aqueous secondary battery in which heat-resistant porous layers were formed on both sides of the polyolefin microporous membrane was obtained.

The measured results of properties of the obtained separator for non-aqueous secondary battery (membrane thickness, unit weight, porosity, Gurley number, membrane resistance, penetration strength, tensile strength, shutdown temperature, heat resistance, heat shrinkage ratio, recovery rate after pressurization) are shown in Table 3. The results of the separator for non-aqueous secondary battery in Examples and Comparative Examples are also shown in Tables 3 to 6.

Example 11

A separator for non-aqueous secondary battery was obtained in the same manner as in Example 10 except that, as the polyolefin microporous membrane, the one produced in Example 2 was employed.

Example 12

A separator for non-aqueous secondary battery was obtained in the same manner as in Example 10 except that, as the polyolefin microporous membrane, the one produced in Example 3 was employed.

Example 13

A separator for non-aqueous secondary battery was obtained in the same manner as in Example 10 except that the clearance between Meyer bars was set to 7 μm.

Example 14

A separator for non-aqueous secondary battery was obtained in the same manner as in Example 10 except that the mixing ratio of DMAc and TPG was made 40:60 (mass ratio); the clearance between Meyer bars was set to 60 μm; and the composition of the coagulation liquid was adjusted such that water:DMAc:TPG=50:30:20.

Example 15

A separator for non-aqueous secondary battery was obtained in the same manner as in Example 10 except that the mixing ratio of DMAc and TPG was made 40:60 (mass ratio); the clearance between Meyer bars was set to 75 μm; and the composition of the coagulation liquid was adjusted such that water:DMAc:TPG=50:30:20.

Example 16

A separator for non-aqueous secondary battery was obtained in the same manner as in Example 10 except that the mixing ratio of DMAc and TPG was made 35:65 (mass ratio); the clearance between Meyer bars was set to 60 μm; and the composition of the coagulation liquid was adjusted such that water:DMAc:TPG=50:32:18.

Example 17

A separator for non-aqueous secondary battery was obtained in the same manner as in Example 10 except that the mixing ratio of DMAc and TPG was made 70:30 (mass ratio); and the composition of the coagulation liquid was adjusted such that water:DMAc:TPG=50:15:35.

Example 18

A separator for non-aqueous secondary battery was obtained in the same manner as in Example 10 except that, as the polyolefin microporous membrane, the one produced in Example 4 was employed.

Example 19

A separator for non-aqueous secondary battery was obtained in the same manner as in Example 10 except that, as the polyolefin microporous membrane, the one produced in Example 5 was employed.

Example 20

A separator for non-aqueous secondary battery was obtained in the same manner as in Example 10 except that, as the polyolefin microporous membrane, the one produced in Example 6 was employed.

Example 21

A separator for non-aqueous secondary battery was obtained in the same manner as in Example 18 except that the clearance between Meyer bars was set to 7 μm.

Example 22

A separator for non-aqueous secondary battery was obtained in the same manner as in Example 18 except that the mixing ratio of DMAc and TPG was made 40:60 (mass ratio); the clearance between Meyer bars was set to 60 μm; and the composition of the coagulation liquid was adjusted such that water:DMAc:TPG=50:30:20.

Example 23

A separator for non-aqueous secondary battery was obtained in the same manner as in Example 18 except that the mixing ratio of DMAc and TPG was made 40:60 (mass ratio); the clearance between Meyer bars was set to 75 μm; and the composition of the coagulation liquid was adjusted such that water:DMAc:TPG=50:30:20.

Example 24

A separator for non-aqueous secondary battery was obtained in the same manner as in Example 18 except that the mixing ratio of DMAc and TPG was made 35:65 (mass ratio); the clearance between Meyer bars was set to 60 μm; and the composition of the coagulation liquid was adjusted such that water:DMAc:TPG=50:32:18.

Example 25

A separator for non-aqueous secondary battery was obtained in the same manner as in Example 18 except that the mixing ratio of DMAc and TPG was made 70:30 (mass ratio); and the composition of the coagulation liquid was adjusted such that water:DMAc:TPG=50:15:35.

Example 26

A separator for non-aqueous secondary battery was obtained in the same manner as in Example 10 except that, as the polyolefin microporous membrane, the one produced in Example 7 was employed.

Example 27

A separator for non-aqueous secondary battery was obtained in the same manner as in Example 10 except that, as the polyolefin microporous membrane, the one produced in Example 8 was employed.

Example 28

A separator for non-aqueous secondary battery was obtained in the same manner as in Example 10 except that, as the polyolefin microporous membrane, the one produced in Example 9 was employed.

Example 29

A separator for non-aqueous secondary battery was obtained in the same manner as in Example 26 except that the clearance between Meyer bars was set to 7 μm.

Example 30

A separator for non-aqueous secondary battery was obtained in the same manner as in Example 26 except that the mixing ratio of DMAc and TPG was made 40:60 (mass ratio);

the clearance between Meyer bars was set to 60 μm; and the composition of the coagulation liquid was adjusted such that water:DMAc:TPG=50:30:20.

Example 31

A separator for non-aqueous secondary battery was obtained in the same manner as in Example 26 except that the mixing ratio of DMAc and TPG was made 40:60 (mass ratio); the clearance between Meyer bars was set to 75 μm; and the composition of the coagulation liquid was adjusted such that water:DMAc:TPG=50:30:20.

Example 32

A separator for non-aqueous secondary battery was obtained in the same manner as in Example 26 except that the mixing ratio of DMAc and TPG was made 35:65 (mass ratio); the clearance between Meyer bars was set to 60 μm; and the composition of the coagulation liquid was adjusted such that water:DMAc:TPG=50:32:18.

Example 33

A separator for non-aqueous secondary battery was obtained in the same manner as in Example 26 except that the mixing ratio of DMAc and TPG was made 70:30 (mass ratio); and the composition of the coagulation liquid was adjusted such that water:DMAc:TPG=50:15:35.

Comparative Example 12

A separator for non-aqueous secondary battery was obtained in the same manner as in Example 10 except that, as the polyolefin microporous membrane, the one produced in Comparative Example 1 was employed.

Comparative Example 13

A separator for non-aqueous secondary battery was obtained in the same manner as in Example 10 except that, as the polyolefin microporous membrane, the one produced in Comparative Example 2 was employed.

Comparative Example 14

A separator for non-aqueous secondary battery was obtained in the same manner as in Example 10 except that, as the polyolefin microporous membrane, the one produced in Comparative Example 3 was employed.

Comparative Example 15

A separator for non-aqueous secondary battery was obtained in the same manner as in Example 10 except that, as the polyolefin microporous membrane, the one produced in Comparative Example 4 was employed.

Comparative Example 16

A separator for non-aqueous secondary battery was obtained in the same manner as in Example 10 except that, as the polyolefin microporous membrane, the one produced in Comparative Example 5 was employed.

Comparative Example 17

A separator for non-aqueous secondary battery was obtained in the same manner as in Example 10 except that, as the polyolefin microporous membrane, the one produced in Comparative Example 6 was employed.

Comparative Examples 18 to 22

Separators for non-aqueous secondary battery were obtained in the same manner as in Example 10 except that, as the polyolefin microporous membranes, those produced in Comparative Examples 7 to 11 were employed individually.

TABLE 3

| | | | Example 10 | Example 11 | Example 12 | Example 13 | Example 14 | Example 15 | Example 16 | Example 17 |
|---|---|---|---|---|---|---|---|---|---|---|
| Polyolefin microporous membrane used | | | Example 1 | Example 2 | Example 3 | Example 1 | Example 1 | Example 1 | Example 1 | Example 1 |
| Heat-resistant porous layer | Film thickness | [μm] | 6 | 6 | 6 | 2 | 20 | 25 | 20 | 6 |
| | Unit weight | [g/m$^2$] | 5.1 | 5.1 | 5.1 | 2.7 | 12.2 | 13.2 | 8.4 | 8.9 |
| | Porosity | [%] | 60 | 60 | 60 | 35 | 71 | 75 | 80 | 30 |
| Complex membrane | Film thickness | [μm] | 18 | 18 | 18 | 14 | 32 | 37 | 32 | 18 |
| | Unit weight | [g/m$^2$] | 11.3 | 11.4 | 11.3 | 8.8 | 18.3 | 19.2 | 14.5 | 14.9 |
| | Porosity | [%] | 48 | 47 | 48 | 41 | 60 | 64 | 66 | 38 |
| | Gurley number | [sec/100 cc] | 296 | 292 | 296 | 280 | 310 | 315 | 320 | 310 |
| | Membrane resistance | [ohm · cm$^2$] | 2.6 | 2.5 | 2.6 | 2.3 | 3 | 3.2 | 3.2 | 2.9 |
| | Penetration strength | [g] | 350 | 358 | 350 | 345 | 360 | 360 | 360 | 352 |
| | Tensile strength | [N] | 22 | 23 | 22 | 22 | 23 | 23 | 23 | 22 |
| | Shutdown temperature | [° C.] | 143 | 141 | 142 | 143 | 143 | 143 | 143 | 143 |
| | Heat resistance | [—] | ○ | ○ | ○ | ○ | ○ | ○ | ○ | ○ |
| | Heat shrinkage ratio | [%] | 12 | 11 | 10 | 14 | 10 | 9 | 10 | 11 |
| | Recovery rate after pressurization | [%] | 99 | 97 | 93 | 82 | 89 | 75 | 79 | 85 |

TABLE 4

|  |  |  | Example 18 | Example 19 | Example 20 | Example 21 | Example 22 | Example 23 | Example 24 | Example 25 |
|---|---|---|---|---|---|---|---|---|---|---|
| Polyolefin microporous membrane used |  |  | Example 4 | Example 5 | Example 6 | Example 4 | Example 4 | Example 4 | Example 4 | Example 4 |
| Heat-resistant porous layer | Film thickness | [μm] | 6 | 6 | 6 | 2 | 20 | 25 | 20 | 6 |
|  | Unit weight | [g/m²] | 5.1 | 5.1 | 5.1 | 2.7 | 12.2 | 13.2 | 8.4 | 8.9 |
|  | Porosity | [%] | 60 | 60 | 60 | 35 | 71 | 75 | 80 | 30 |
| Complex membrane | Film thickness | [μm] | 18 | 18 | 18 | 14 | 32 | 37 | 32 | 18 |
|  | Unit weight | [g/m²] | 11.2 | 11.1 | 11.2 | 8.8 | 18.3 | 19.2 | 14.5 | 14.9 |
|  | Porosity | [%] | 49 | 49 | 49 | 42 | 61 | 65 | 66 | 39 |
|  | Gurley number | [sec/100 cc] | 301 | 305 | 301 | 290 | 311 | 321 | 315 | 307 |
|  | Membrane resistance | [ohm·cm²] | 2.7 | 2.7 | 2.7 | 2.4 | 3 | 3.1 | 3.1 | 2.9 |
|  | Penetration strength | [g] | 342 | 334 | 342 | 340 | 350 | 355 | 352 | 345 |
|  | Tensile strength | [N] | 22 | 23 | 22 | 22 | 23 | 23 | 23 | 22 |
|  | Shutdown temperature | [°C.] | 140 | 139 | 140 | 140 | 140 | 140 | 140 | 140 |
|  | Heat resistance | [—] | ○ | ○ | ○ | ○ | ○ | ○ | ○ | ○ |
|  | Heat shrinkage ratio | [%] | 16 | 15 | 17 | 18 | 14 | 12 | 12 | 15 |
|  | Recovery rate after pressurization | [%] | 99 | 98 | 97 | 82 | 89 | 75 | 79 | 85 |

TABLE 5

|  |  |  | Example 26 | Example 27 | Example 28 | Example 29 | Example 30 | Example 31 | Example 32 | Example 33 |
|---|---|---|---|---|---|---|---|---|---|---|
| Polyolefin microporous membrane used |  |  | Example 7 | Example 8 | Example 9 | Example 7 | Example 7 | Example 7 | Example 7 | Example 7 |
| Heat-resistant porous layer | Film thickness | [μm] | 6 | 6 | 6 | 2 | 20 | 25 | 20 | 6 |
|  | Unit weight | [g/m²] | 5.1 | 5.1 | 5.1 | 2.7 | 12.2 | 13.2 | 8.4 | 8.9 |
|  | Porosity | [%] | 60 | 60 | 60 | 35 | 71 | 75 | 80 | 30 |
| Complex membrane | Film thickness | [μm] | 17 | 17 | 17 | 14 | 32 | 37 | 32 | 18 |
|  | Unit weight | [g/m²] | 10.6 | 10.7 | 10.7 | 8.8 | 18.3 | 19.2 | 14.5 | 14.9 |
|  | Porosity | [%] | 50 | 49 | 49 | 40 | 60 | 64 | 65 | 37 |
|  | Gurley number | [sec/100 cc] | 289 | 286 | 286 | 275 | 310 | 315 | 319 | 304 |
|  | Membrane resistance | [ohm·cm²] | 2.5 | 2.5 | 2.4 | 2.3 | 2.6 | 2.8 | 2.8 | 2.6 |
|  | Penetration strength | [g] | 306 | 313 | 313 | 301 | 310 | 315 | 315 | 310 |
|  | Tensile strength | [N] | 21 | 22 | 22 | 21 | 22 | 22 | 22 | 21 |
|  | Shutdown temperature | [°C.] | 141 | 140 | 141 | 141 | 141 | 141 | 141 | 141 |
|  | Heat resistance | [—] | ○ | ○ | ○ | ○ | ○ | ○ | ○ | ○ |
|  | Heat shrinkage ratio | [%] | 18 | 17 | 19 | 19 | 16 | 15 | 15 | 17 |
|  | Recovery rate after pressurization | [%] | 99 | 96 | 98 | 82 | 89 | 75 | 79 | 85 |

TABLE 6

|  |  |  | Comp. Example 12 | Comp. Example 13 | Comp. Example 14 | Comp. Example 15 | Comp. Example 16 | Comp. Example 17 | Comp. Example 18 | Comp. Example 19 | Comp. Example 20 | Comp. Example 21 | Comp. Example 22 |
|---|---|---|---|---|---|---|---|---|---|---|---|---|---|
| Polyolefin microporous membrane used |  |  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 | Comp. Example 10 | Comp. Example 11 |
| Heat-resistant porous layer | Film thickness | [μm] | 6 | 6 | 6 | 6 | 6 | 6 | 6 | 6 | 6 | 6 | 6 |
|  | Unit weight | [g/m²] | 5.1 | 5.1 | 5.1 | 5.1 | 5.1 | 5.1 | 5.1 | 5.1 | 5.1 | 5.1 | 5.1 |
|  | Porosity | [%] | 60 | 60 | 60 | 60 | 60 | 60 | 60 | 60 | 60 | 60 | 60 |
| Complex membrane | Film thickness | [μm] | 18 | 18 | 18 | 18 | 17 | 17 | 17.5 | 16.5 | 18 | 20.7 | 16.9 |
|  | Unit weight | [g/m²] | 11.1 | 11.4 | 11.1 | 11.3 | 10.6 | 10.7 | 12.0 | 11.4 | 12.2 | 12.4 | 11.1 |
|  | Porosity | [%] | 49 | 47 | 49 | 48 | 50 | 49 | 44 | 45 | 45 | 51 | 48 |
|  | Gurley number | [sec/100 cc] | 305 | 292 | 305 | 296 | 289 | 286 | 381 | 393 | 445 | 303 | 380 |
|  | Membrane resistance | [ohm·cm²] | 2.7 | 2.5 | 2.7 | 2.6 | 2.7 | 2.5 | 3.7 | 3.6 | 3.7 | 3.1 | 3.3 |
|  | Penetration strength | [g] | 334 | 358 | 334 | 350 | 306 | 313 | 391 | 406 | 487 | 526 | 356 |
|  | Tensile strength | [N] | 19 | 23 | 19 | 23 | 19 | 23 | 22 | 26 | 25 | 27 | 23 |
|  | Shutdown temperature | [°C.] | 144 | 149 | 148 | 149 | 146 | 149 | 144 | 145 | 145 | 147 | 145 |
|  | Heat resistance | [—] | ○ | ○ | ○ | ○ | ○ | ○ | ○ | ○ | ○ | ○ | ○ |
|  | Heat shrinkage ratio | [%] | 18 | 12 | 12 | 15 | 13 | 18 | 14 | 15 | 19 | 19 | 14 |

TABLE 6-continued

|  |  | Comp. Example 12 | Comp. Example 13 | Comp. Example 14 | Comp. Example 15 | Comp. Example 16 | Comp. Example 17 | Comp. Example 18 | Comp. Example 19 | Comp. Example 20 | Comp. Example 21 | Comp. Example 22 |
|---|---|---|---|---|---|---|---|---|---|---|---|---|
| Recovery rate after pressurization | [%] | 63 | 58 | 61 | 65 | 70 | 75 | 66 | 79 | 73 | 67 | 78 |

Examples 34 to 66, Comparative Examples 23 to 44

Non-aqueous secondary batteries were produced by using the polyolefin microporous membranes or the separators for non-aqueous secondary battery produced in Examples 1 to 33 and Comparative Examples 1 to 22, and the cycle properties thereof were evaluated.

—Preparation of Test Batteries—
~Preparation of Positive Electrode~

By using N-methyl-pyrrolidone, 89.5 parts by mass of lithium cobaltate ($LiCoO_2$: manufactured by NIPPON CHEMICAL INDUSTRIAL CO., LTD.), 4.5 parts by mass of acetylene black (DENKA BLACK manufactured by DENKI KAGAKU KOGYOU KABUSHIKI KAISHA) and 6 parts by mass of polyvinylidene fluoride (manufactured by KUREHA CORPORATION) were kneaded to produce a slurry. The obtained slurry was coated on an aluminum foil having a thickness of 20 μm, dried, and then pressed to obtain a 100 μm positive electrode.

~Preparation of Negative Electrode~

By using N-methyl-2pyrrolidone, 87 parts by mass of meso phase carbon microbeads (MCMB: manufactured by Osaka Gas Chemicals Co., Ltd.), 3 parts by mass of acetylene black (trade name: DENKA BLACK, manufactured by DENKI KAGAKU KOGYOU KABUSHIKI KAISHA) and 10 parts by mass of polyvinylidene fluoride (manufactured by KUREHA CORPORATION) were kneaded to produce a slurry. The obtained slurry was coated on a copper foil having a thickness of 18 μm, dried, and then pressed to obtain a 90 μm negative electrode.

~Preparation of Battery~

The polyolefin microporous membrane or separator for non-aqueous secondary battery produced in Examples 1 to 33 and Comparative Examples 1 to 22 was sandwiched between the positive electrode and the negative electrode respectively. The resultant was impregnated with an electrolyte and enclosed in an outer package composed of an aluminum laminate film to produce non-aqueous secondary batteries in Examples 12 to 22 and Comparative Examples 5 to 8. Here, as the electrolyte, 1M $LiPF_6$ ethylene carbonate/ethylmethyl-carbonate (mass ratio: 3/7) (manufactured by KISHIDA CHEMICAL Co., Ltd.) was employed.

This test battery had a positive electrode area of 2×1.4 $cm^2$, a negative electrode area of 2.2×1.6 $cm^2$ and a set capacity of 8 mAh (in the range of 4.2 V-2.75 V).

—Evaluation of Cycle Properties—

For each of the obtained non-aqueous secondary batteries, 4.0 V of constant-current and constant-voltage charge and 2.75 V of constant-current discharge were repeated for 100 cycles and then the discharged capacity was measured. The value obtained by dividing the discharged capacity after 100 cycles by the discharged capacity after 3 cycles was defined as a discharged capacity retention (%), which was employed as an index of cycle properties. The measured results are shown in Tables 7 to 8.

TABLE 7

| Battery | Separator used | Cycle properties (discharged capacity retention [%]) |
|---|---|---|
| Example 34 | Example 1 | 96 |
| Example 35 | Example 2 | 91 |
| Example 36 | Example 3 | 92 |
| Example 37 | Example 10 | 77 |
| Example 38 | Example 11 | 63 |
| Example 39 | Example 12 | 95 |
| Example 40 | Example 13 | 90 |
| Example 41 | Example 14 | 91 |
| Example 42 | Example 15 | 86 |
| Example 43 | Example 16 | 85 |
| Example 44 | Example 17 | 81 |
| Example 45 | Example 4 | 98 |
| Example 46 | Example 5 | 95 |
| Example 47 | Example 6 | 93 |
| Example 48 | Example 18 | 75 |
| Example 49 | Example 19 | 60 |
| Example 50 | Example 20 | 97 |
| Example 51 | Example 21 | 94 |
| Example 52 | Example 22 | 92 |
| Example 53 | Example 23 | 86 |
| Example 54 | Example 24 | 85 |
| Example 55 | Example 25 | 81 |
| Example 56 | Example 7 | 92 |
| Example 57 | Example 8 | 94 |
| Example 58 | Example 9 | 93 |
| Example 59 | Example 26 | 65 |
| Example 60 | Example 27 | 83 |
| Example 61 | Example 28 | 91 |
| Example 62 | Example 29 | 93 |
| Example 63 | Example 30 | 92 |
| Example 64 | Example 31 | 86 |
| Example 65 | Example 32 | 85 |
| Example 66 | Example 33 | 81 |

TABLE 8

| Battery | Separator used | Cycle properties (discharged capacity retention [%]) |
|---|---|---|
| Comp. Example 23 | Comp. Example 1 | 80 |
| Comp. Example 24 | Comp. Example 2 | 83 |
| Comp. Example 25 | Comp. Example 12 | 76 |
| Comp. Example 26 | Comp. Example 13 | 62 |
| Comp. Example 27 | Comp. Example 3 | 80 |
| Comp. Example 28 | Comp. Example 4 | 83 |
| Comp. Example 29 | Comp. Example 14 | 74 |
| Comp. Example 30 | Comp. Example 15 | 59 |
| Comp. Example 31 | Comp. Example 5 | 80 |
| Comp. Example 32 | Comp. Example 6 | 83 |
| Comp. Example 33 | Comp. Example 16 | 64 |
| Comp. Example 34 | Comp. Example 17 | 82 |
| Comp. Example 35 | Comp. Example 7 | 60 |
| Comp. Example 36 | Comp. Example 8 | 62 |
| Comp. Example 37 | Comp. Example 9 | 65 |
| Comp. Example 38 | Comp. Example 10 | 68 |
| Comp. Example 39 | Comp. Example 11 | 78 |
| Comp. Example 40 | Comp. Example 18 | 75 |
| Comp. Example 41 | Comp. Example 19 | 76 |
| Comp. Example 42 | Comp. Example 20 | 74 |
| Comp. Example 43 | Comp. Example 21 | 75 |
| Comp. Example 44 | Comp. Example 22 | 74 |

Example 67, Comparative Example 45

By the method below, on the polyolefin microporous membrane obtained in Example 1 and Comparative Example 1, an adhesive porous layer containing a vinylidene fluoride resin is layered to produce a separator for non-aqueous secondary battery.

A vinylidene fluoride resin having a copolymer composition of VdF/HFP/CTFE=−92.0/4.5/3.5 (mass ratio) and a weight-averaged molecular weight of 410,000 was dissolved in a mixed solvent of DMAc (organic solvent): TPG (phase separating agent)=60:40 (mass ratio) such that the percentage of the resin was 12% by mass to prepare a dope.

This dope was coated on both sides of the polyethylene microporous membrane. Subsequently, the polyethylene microporous membrane on which the dope was coated was immersed in a coagulation bath to coagulate the coated layer. Here, the composition of the coagulation bath was as follows: water:DMAc:TPG=50:30:20 (mass ratio). Next, washing with water and drying were performed. By this, a separator for non-aqueous secondary battery in which adhesive porous layers are formed on both sides of the polyolefin microporous membrane was obtained.

For the obtained separator for non-aqueous secondary battery, the adherence thereof was evaluated by the method below.

In the same way as in Example 38, a positive electrode and a negative electrode were produced. Between the positive electrode and the negative electrode, a separator for non-aqueous secondary battery was sandwiched to be laminated in the following order: the positive electrode/the separator/the negative electrode. This laminate was thermally compressed at 70° C., 1 MPa for 60 seconds, and subjected to T-type peeling at 150 mm/min. by using Tensilon (RTC-1210A, manufactured by ORIENTEC Co., Ltd.). Setting the area of the peeling surface to 100, when the percentage of the area on which negative-electrode active material is moved to the side of the separator was 90% or larger, the adherence was evaluated as "A", and when the percentage was smaller than 90%, the adherence was evaluated as "B". The measured results are shown in Table 9.

TABLE 9

| | | | Example 67 | Comp. Example 45 |
|---|---|---|---|---|
| Polyolefin microporous membrane used | | | Example 1 | Comp. Example 1 |
| Adhesive porous layer | Film thickness | μm | 3.4 | 3.4 |
| | Unit weight | g/m² | 2.5 | 2.5 |
| | Porosity | % | 59 | 58 |
| Complex membrane | Film thickness | μm | 15.4 | 15.4 |
| | Unit weight | g/m² | 9.7 | 9.8 |
| | Porosity | % | 46 | 45 |
| | Gurley number | sec/100 cc | 300 | 380 |
| | Membrane resistance | ohm · cm² | 2.4 | 3.8 |
| | Recovery rate after pressurization | % | 99 | 80 |
| | Adherence | — | A | B |

INDUSTRIAL APPLICABILITY

By the polyolefin microporous membrane of the present invention, even when the polyolefin microporous membrane is complexed with a heat-resistant porous layer, good mechanical strength and shutdown properties are obtained and electrolyte depletion is prevented by controlling the degree of crystallinity and the tie molecule volume fraction. The safety of a non-aqueous secondary battery using the polyolefin microporous membrane or a separator for non-aqueous secondary battery including the same is thus secured.

In the following, preferred embodiments of a polyolefin microporous membrane of the present invention will be shown.

<1> The polyolefin microporous membrane of the present invention is configured that a degree of crystallinity is from 60 to 85%, and a tie molecular volume fraction is from 0.7 to 1.7%.

<2> The polyolefin microporous membrane as described in the above <1>, wherein the tie molecular volume fraction of the polyolefin is from 0.7 to 1.5%.

<3> A polyolefin microporous membrane as described in the above <1> or <2>, wherein a number average molecular weight is from 30,000 to 80,000.

<4> A polyolefin microporous membrane as described in any one of the above <1> to <3>, wherein a number of short chain branches contained in 1000 carbon atoms in a main chain of the polyolefin is from 1 to 5.

<5> The polyolefin microporous membrane as described in any one of the above <1> to <4>, including a polyolefin containing an ultra-high molecular weight polyethylene having a weight-average molecular weight of 1,000,000 or higher and a high-density polyethylene having a density of 0.942 g/cm³.

<6> The polyolefin microporous membrane as described in any one of the above <1> to <5>, which is produced by
  preparing a polyolefin solution by melt-kneading from 1 to 35 parts by mass of polyolefin and from 65 to 99 parts by mass of mixed solvent comprising a volatile solvent and a nonvolatile solvent at from 190 to 220° C.;
  forming a gel composition by extruding the polyolefin solution through a die at a temperature from the melting point of the polyolefin to the melting point +60° C. and cooling the extruded polyolefin solution;
  removing the volatile solvent from the gel composition;
  drawing the gel composition; and
  removing the nonvolatile solvent from the gel composition.

<7> A separator for a non-aqueous secondary battery, the separator comprising:
  the polyolefin microporous membrane as described in any one of the above <1> to <6>; and
  a heat resistant porous layer containing a heat resistant resin and provided on one side or both sides of the polyolefin microporous membrane.

<8> The separator for non-aqueous secondary battery as described in the above <7>, wherein the heat resistant resin is at least one resin selected from the group consisting of fully aromatic polyamides, polyimides, polyamide imides, polysulfones, polyketones, polyetherketones, polyether imides and cellulose.

<9> The separator for non-aqueous secondary battery as described in the above <7> or <8>, wherein the heat resistant porous layer further contains an inorganic filler.

<10> The separator for non-aqueous secondary battery as described in the above <9>, wherein the inorganic filler is at least one of aluminium hydroxide or magnesium hydroxide.

<11> A separator for a non-aqueous secondary battery, the separator comprising:
  the polyolefin microporous membrane as described in any one of the above <1> to <6>; and
  an adhesive porous layer containing vinylidene fluoride resin provided on one side or both sides of the polyolefin microporous membrane.

<12> The separator for non-aqueous secondary battery as described in the above <11>, wherein the vinylidene fluoride resin is selected from the group consisting of:
(i) polyvinylidene fluoride; and
(ii) a copolymer in which a vinylidene fluoride, and at least one of hexafluoropropylene, chlorotrifluoroethylene, hexafluoroethylene or ethylene are at least copolymerized.
<13> A non-aqueous secondary battery, comprising:
a positive electrode;
a negative electrode; and
the polyolefin microporous membrane as described in any one of the above <1> to <6> or the separator for a non-aqueous secondary battery as described in any one of the above <7> to <12>, which is disposed between the positive electrode and the negative electrode, and wherein an electromotive force is obtained by doping and dedoping lithium.
<14> A method of producing the polyolefin microporous membrane as described in any one of the above <1> to <6>, the method comprising:
preparing a polyolefin solution by kneading from 1 to 35 parts by mass of polyolefin and from 65 to 99 parts by mass of mixed solvent composed of a volatile solvent and a nonvolatile solvent at from 190 to 220° C. (drawing process);
forming a gel composition by extruding the polyolefin solution through a die at a temperature from the melting point of the polyolefin to the melting point +60° C. and cooling the extruded polyolefin solution (extruding process);
removing the volatile solvent from the gel composition (the first solvent removal process);
drawing the gel composition (drawing process); and
removing the nonvolatile solvent from the gel composition (the second solvent removal process).

The entire disclosures of Japanese Patent Application No. 2010-068117 filed on Mar. 24, 2010, Japanese Patent Application No. 2010-068118 filed on Mar. 24, 2010 and Japanese Patent Application No. 2010-068119 filed on Mar. 24, 2010 are as a whole incorporated herein by reference.

All documents, patent applications and technical specifications recited in this specification are incorporated herein by reference in this specification to the same extent as if each individual publication, patent applications and technical standard was specifically and individually indicated to be incorporated by reference.

The invention claimed is:

1. A method of producing a polyolefin microporous membrane, wherein a degree of crystallinity is from 60 to 85%, and a tie molecule volume fraction is from 0.7 to 1.7%, the method comprising:
preparing a polyolefin solution by kneading from 1 to 35 parts by mass of polyolefin and from 65 to 99 parts by mass of mixed solvent composed of a volatile solvent and a nonvolatile solvent at from 190 to 220° C.;
forming a gel composition by extruding the polyolefin solution through a die at a temperature from the melting point of the polyolefin to the melting point +60° C. and cooling the extruded polyolefin solution;
removing the volatile solvent from the gel composition;
drawing the gel composition; and
removing the nonvolatile solvent from the gel composition.

2. The method of producing the polyolefin microporous membrane according to claim 1, wherein the tie molecule volume fraction of the polyolefin is from 0.7 to 1.5%.

3. The method of producing the polyolefin microporous membrane according to claim 1, wherein a number average molecular weight is from 30,000 to 80,000.

4. The method of producing the polyolefin microporous membrane according to claim 1, wherein a number of short chain branches contained in 1000 carbon atoms in a main chain of the polyolefin is from 1 to 5.

5. The method of producing the polyolefin microporous membrane according to claim 1, comprising a polyolefin containing an ultra-high molecular weight polyethylene having a weight-average molecular weight of 1,000,000 or higher and a high-density polyethylene having a density of 0.942 g/cm$^3$.

* * * * *